(12) United States Patent
Dans

(10) Patent No.: US 6,195,417 B1
(45) Date of Patent: *Feb. 27, 2001

(54) AUTOMATED SYSTEM FOR ACCESSING SPEECH-BASED INFORMATION

(75) Inventor: Ronald F. Dans, Kimberton, PA (US)

(73) Assignee: Telecheck International, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,762

(22) Filed: Nov. 18, 1997

(51) Int. Cl.[7] .......................... H04M 1/64; H04M 11/00; H04M 1/00
(52) U.S. Cl. ................. 379/67.1; 379/88.04; 379/88.24; 379/93.24; 379/352
(58) Field of Search ................. 379/67.1, 88.01, 379/92.01, 92.03, 92.04, 93.24, 352, 88.04, 88.18, 88.24; 395/200.36, 200.54, 200.59; 704/270.1, 270, 271, 275; 709/219, 213, 224, 227

(56) References Cited

U.S. PATENT DOCUMENTS

| | | | |
|---|---|---|---|
| 5,008,930 | * | 4/1991 | Gawrys et al. ..................... 379/210 |
| 5,285,493 | * | 2/1994 | Wagai et al. ........................ 455/566 |
| 5,335,276 | * | 8/1994 | Thompson et al. .................. 380/21 |
| 5,452,356 | * | 9/1995 | Albert .................................... 380/9 |
| 5,524,139 | | 6/1996 | Jones .................................. 379/67 |
| 5,774,663 | * | 6/1998 | Randle et al. ................. 395/200.34 |
| 5,822,405 | * | 10/1998 | Astarabadi ........................... 379/88 |
| 5,825,856 | * | 10/1998 | Porter et al. ...................... 379/93.12 |
| 5,848,130 | * | 12/1998 | Rochkind ............................ 379/67 |
| 5,867,562 | * | 2/1999 | Scherer ................................ 379/88 |
| 5,917,891 | * | 6/1999 | Will .................................. 379/88.03 |
| 5,956,486 | * | 9/1999 | Hickman et al. ............... 395/200.36 |

FOREIGN PATENT DOCUMENTS 0 692 902 A2   1/1996  (EP) .

OTHER PUBLICATIONS

Experiments in Spoken Document Retrieval, *Information Processing & Management*, vol. 32, No. 4, pp. 399–417, Jul. 1996, K. Sparck Jones.

\* cited by examiner

*Primary Examiner*—Krista Zele
*Assistant Examiner*—Allan Hoosain

(57) ABSTRACT

An automated system places telephone calls to speech-based information systems, and interacts with the systems to retrieve information therefrom. The system employs a calling computer which uses speech recognition software to recognize the verbal messages generated by the information systems. A first embodiment of the present invention is designed specifically for calling bank information systems to verify accounts, checking transactions drawn on accounts, etc. This embodiment includes a bank database which contains all of the pertinent information necessary to navigate each of a plurality of bank's information systems through entry of appropriate DTMF tones. A second embodiment of the invention is employed for checking the status of lists of telephone numbers to determine whether the numbers have been changed or disconnected. In this embodiment, the system recognizes verbal messages generated by a telephone company information system, and records new telephone numbers to which old telephone numbers have been changed.

24 Claims, 6 Drawing Sheets

FIG. 4

Bank Enrollment System

File

| Search | Basic Information | IVR Menu Sequence | State DTMF Codes |

QCS Bank ID: 000040001

Bank Name: BANK OF BOSTON

| Wait | Action | Data | Label |
|---|---|---|---|
| 0 | Dial | Telephone Number | START |
| 2 | Dial | 4 | |
| 3 | Dial | Routing Code | RECYCLE |
| 0 | Dial | # | |
| 2 | Dial | Account Number | |
| 0 | Dial | # | |
| 1 | Dial | Check Number | |
| 0 | Dial | # | |
| 1 | Dial | Amount | |
| 0 | Dial | # | |

Wait (Sec): 0    Action: Verify Funds    Data:    Label:

[New] [Delete] [Insert] [Modify] [Cancel]

FIG.5

Enter Verification Information

Key Words:
- <ACCOUNT NUMBER>
- <AMOUNT NUMBER>
- <CHECK NUMBER>
- <CONFIRMATION>

[Add]

Expected Message: AT THIS TIME <CONFIRMATION>

Positive Message: FUNDS ARE AVAILABLE TO PAY A CHECK FOR <IGNORE> DOLLARS AND <FIXED CENTS> CENTS Negative Message: A CHECK FOR <IGNORE> DOLLARS AND <FIXED CENTS> CENTS WOULD NOT BE PAID Invalid Acct. Msg: WE CANNOT COMPLETE YOUR REQUEST THE INFORMATION YOU ENTERED DOES NOT MATCH OUR RECORDS Acct Closed Msg:

Other Msg 1:

Other Msg 2:

[Save]  [Cancel]

AUTOMATED SYSTEM FOR ACCESSING SPEECH-BASED INFORMATION

A portion of this disclosure contains material in which copyright is claimed by the applicant. The applicant has no objection to the copying of this material in the course of making copies of the application file or any patents that may issue on the application, but all other rights whatsoever in the copyrighted material are reserved.

MICROFICHE APPENDIX

The specification of this patent includes a microfiche software Appendix in the form of 3 fiches with a total of 292 frames.

BACKGROUND OF THE INVENTION

The present invention relates to an automated system for accessing and retrieving speech-based information through telephone links using specialized voice recognition software and hardware.

For a number of years, many businesses have employed telephone accessible automated information systems which provide callers with recorded speech-based information without operator interaction. For example, most banks provide such information systems for providing account related information to customers, merchants, etc. A customer may access a bank's information system, and by entering menu selections, account numbers, etc., through actuation of the telephone's buttons or keys, access various account related information, such as balance, checks paid, and deposits, for example. Similarly, a merchant who has been tendered a check by a customer, may employ the bank's information system to determine whether sufficient funds are available to cover the check.

These systems work fine for individual customers, or merchants having only one or a few transactions to verify. However, for large scale merchants (e.g., mail order houses, direct marketers, etc.) having hundreds or even thousands of banking transactions to verify, these systems are very time consuming and costly to employ. In particular, for each transaction, a human operator must telephone the bank information system, listen to the menu and other queries, enter the requested information, and then record the answer to their inquiry. Considering the fact that each transaction may take a number of minutes to verify, a large scale merchant may have to employ a number of individuals whose full time job is to call bank information systems, and verify transactions.

Telephone companies also employ automated information systems to inform callers if a number they have dialed has been changed or disconnected. These systems are very useful because they provide updated information that may not otherwise be available to the callers. Once again, however, if the status of a large list of telephone numbers is to be checked, human operators are required to perform the time consuming task of calling each of the numbers, and recording the status information for each one.

A need for checking the status of lists of telephone numbers has recently developed, particularly in the telemarketing industry, because of the recent huge growth in telephone number assignments resulting from the ever increasing demand for dedicated numbers for computers, fax machines, cellular phones, pagers, etc. To accommodate the increased demand, while still employing the present 10 digit number system, the telephone companies have been forced to change subscriber's area codes and even entire telephone numbers in some instances. As a result, the telephone number lists employed by telemarketers quickly become outdated such that a large number (e.g.,10–20%) of all calls placed by the telemarketer's representatives are answered with a recorded message that the number has either been changed, or is no longer in service. Obviously, this results in much of the representative's time being wasted. As a result, a need has been created for a means by which the telephone numbers on the lists can be screened to determine which of the numbers generate a call intercept when dialed indicating that the number has either been changed or disconnected so that the representatives need not spend time either dialing these numbers or listening to the call intercept messages.

In view of the foregoing, a need therefore exists for an automated system which can access speech-based information systems over conventional telephone links, recognize the words "spoken" by the information systems, and convert the information to a computerized form.

SUMMARY OF THE INVENTION

The present invention satisfies the foregoing need through provision of a fully automated system which, through use of voice recognition and other related software or hardware, facilitates access and retrieval of information from a speech-based information system without the need for a human operator. In its broadest sense, the system includes a calling computer containing a line manager for placing telephone calls over one or more telephone links or lines, speech recognition software for recognizing verbal messages generated by a speech-based information system answering each call, and a state machine program for controlling the line manager and speech recognition software in the manner necessary to place a call, enter any DTMF tones that may be necessary to navigate an option menu of a called information system, and recognize the verbal responses generated by the information system. One or more feed applications and databases are preferably employed for entering verification requests (e.g., banking account transaction verifications, telephone numbers, status verification, etc.) into the system for processing. Preferably, a scheduler program is employed for managing this task.

A first preferred embodiment of the present invention comprises a system which calls telephone accessible bank information systems to verify account transactions, recognizes each bank system's verbal prompts and commands, enters the necessary responses to the prompts and commands using DTMF tones, and stores the responses to their inquiries. This embodiment is preferably designed to process thousands of checking transactions to be drawn against hundreds of different banks. A bank information database is therefore provided which stores all of the pertinent information for each bank's information system. In particular, the database stores the automated menu, and the possible verbal responses which are generated in response to an inquiry. For example, the menu may request that a particular number be pressed followed by the # button to request verification of a merchant transaction, after which the checking account information and dollar amount of the check would be entered, again each followed by actuation of the # button. In response, the information system typically provides a verbal message that the account 1) has sufficient funds to pay the check, 2) has insufficient funds to pay the check, or, 3) is otherwise invalid. The bank database stores all of this detailed information so that for each bank's information system, the system knows exactly the necessary sequence of DTMF tones to enter for verifying a transaction, and recognizes the verbal responses provided by the information system.

To manage the reception and processing of thousands of checking transactions to be verified, each of which may be entered into the system from various sources, the first embodiment of the present invention employs a number of software and/or hardware modules. Incoming transactions arrive from one or more sources, including for example, other computer applications, callers using touch tone telephones, and a system operator who enters them directly. These inquiries are passed from the feed applications into a main computer containing the scheduler. The scheduler, using information stored in a priority database, determines when, and in what order, the requests should be passed onto the calling computer. In addition, the check information for each transaction to be verified, e.g., account information and dollar amount, is directed to, and stored in, a check information database.

A resource manager application resident in the calling computer informs the scheduler when the calling computer has one or more telephone lines available for placing transaction verification calls. In response, the scheduler polls each of the feed applications in a "round robin" manner based upon information received from the priority database, to determine whether any of the feed applications has transactions to be verified. If so, the scheduler retrieves the transaction information from the check information database, and delivers it to the resource manager. The resource manager then accesses the necessary bank information from the bank database which will permit construction of the state machine to carry out the necessary sequence of steps to call the designated bank's information system, and enter the necessary information to process the verification request. More particularly, the state machine controls the actual verification process by placing a call to the designated bank, entering the necessary DTMF tones to move through the menu tree, entering the check information and recognizing the verbal messages generated by the bank's information system in response thereto. The speech recognition module is provided to carry out the speech recognition, and preferably accesses context data for each bank to facilitate quick recognition of each verbal message.

Preferably, the system of the first preferred embodiment of the present invention employs a number of additional features to facilitate efficient processing of the entered transactions. For example, if the system has trouble processing requests for a particular bank because it keeps receiving a response that it does not recognize from that bank's information system, this is an indication that the bank has probably changed its menu and/or messages. The system therefore generates an indication that the bank information should be checked. An operator can then manually call the bank's information system, and make any changes to the information stored in the bank database which are necessary to process future transaction verification requests for that bank. In addition, the priority changer enables system operators to control the order in which requests are processed, and also enables the system to group requests by bank so that multiple transaction verification requests can be processed for the same bank with a single telephone call.

A second preferred embodiment of the present invention is designed specifically for verifying the status of telephone numbers. In particular, the system in this embodiment calls telephone numbers received from the feed applications and detects whether a call intercept occurs for each number. If an intercept is detected, the system records the message played after the intercept, and then uses voice recognition to identify the content of the message. This embodiment functions in much the same manner as the first embodiment, and uses many of the same elements, however, the programming is obviously different to accommodate the different functions. For example, the state machine program which controls the actual calling process is simplified in this embodiment since telephone number status messages do not employ menus requiring entry of DTMF tones. Thus, the state machine need only to place each call, and determine what message is played using the recognizer.

This embodiment also differs from the first embodiment in that it uses ISDN technology in which signalling information is sent in a "D" channel that is separate from the voice ("B") channel. By monitoring the signalling information sent through the "D" channel, the system can quickly determine the status of many telephone numbers, and move on to the next number to be verified. In particular, the signalling information immediately indicates whether the called number is being rung, is not allocated, is busy, has been changed, is out of order, or has been rejected by the local telephone company. Only if the number is indicated as being changed need the system stay on the line and record the new number information. Otherwise, the system terminates the call, and marks the number in accordance with the signalling information.

BRIEF DESCRIPTION OF THE DRAWINGS

The foregoing and other features and advantages of the present invention will become apparent from the following detailed description of a preferred embodiment thereof, taken in conjunction with the accompanying drawings, in which:

FIG. 4 is an illustration of a computer screen employed in the first preferred embodiment for entering the specific data entry sequence for accessing a bank's information system, and verifying a check transaction;

FIG. 5 is an illustration of a computer screen employed in the first preferred embodiment for entering verification messages which the system expects to receive from a bank's information system in response to an entered verification request.

DETAILED DESCRIPTION OF THE PREFERRED EMBODIMENTS

Figure 1:
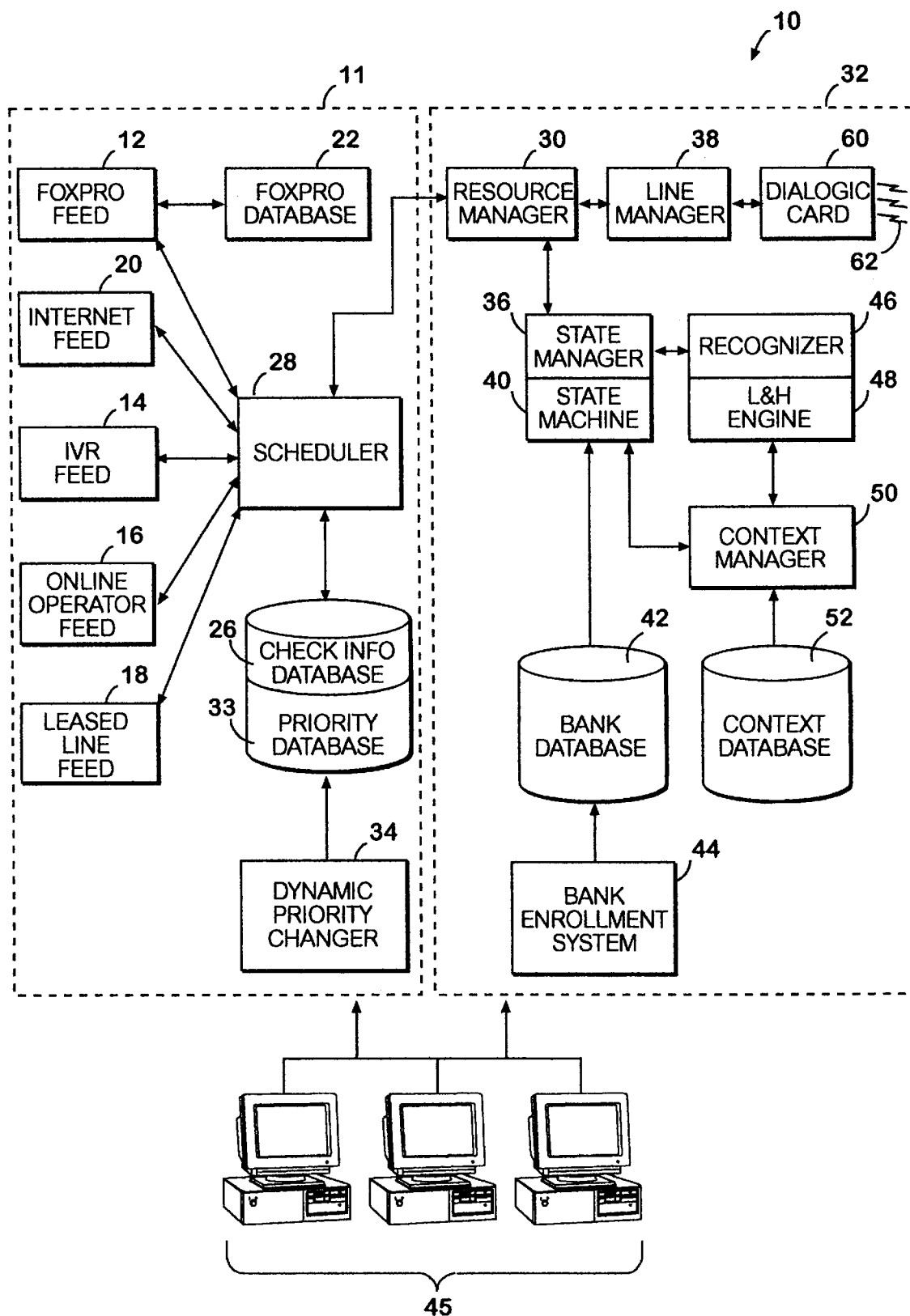
FIG. 1 is a schematic block diagram of a system constructed in accordance with a first preferred embodiment of the present invention for automatically processing check transaction verification requests.

FIG. 1 illustrates a system 10 constructed in accordance with a first preferred embodiment of the present invention for accessing automated bank information systems, and verifying checking account transactions. The system 10 includes a main computer 11 for receiving and scheduling transaction verification requests to be processed. The main computer 11 includes a number of feed applications 12–20 which facilitate entry of transactions to be verified from a variety of sources. These applications are selected to accommodate any suitable type of input data format, and those illustrated in FIG. 1, represent only a selected number of examples of such applications. More particularly, the feed applications include a FOXPRO feed 12, an interactive voice responsive (IVR) feed 14, an online operator feed 16, a leased line feed 18 and an Internet feed 20.

The FOXPRO feed 12 is designed specifically for processing requests that have been entered in FOXPRO format in a FOXPRO database 22. The IVR application 14 enables entry of requests by merchants, or the like, using DTMF codes entered by a conventional touch-tone telephone's keypad. The merchant enters the check information much as they would if interacting directly with the bank's information system. However, the system 10 enables a merchant to request validation of a plurality of check transactions from various banks in a single call. Further, the prompts or commands for data entry generated by the IVR application 14 will all be the same, regardless of the bank on which a particular check is drawn. The online operator feed 16 facilitates direct entry of check information by an operator of the system 10, in response to information obtained in any suitable manner, such as directly from a merchant over the telephone or in written form. The leased line feed 18 enables entry of groups of verification requests which are typically received electronically, e.g., via e-mail, from large scale merchants, such as direct marketers, mail-order houses, etc. Finally, the Internet feed 20, as the name implies, facilitates entry of requests directly over the Internet from merchants or other computer applications.

The verification requests received by the feed applications 12–20 each contain a requester ID, the routing number for the bank, the bank account number, the dollar amount of the transaction and the priority of the request. All of this information is temporarily stored in a check info database 26 until the requests are ready to be processed by the system 10 as described in further detail below.

A scheduler module or application 28 controls the actual process scheduling of the transactions from each of the feed applications 12–20 in response to instructions received from a resource manager 30 in one or more calling computers 32. It will be understood that any number of the calling computers 32 may be employed in the system 10, however, the details of only one of the calling computers 32 are illustrated in FIG. 1 for clarity. The resource manager 30 informs the scheduler 28 how many transactions it is ready to process. In response, the scheduler 28, using a "round robin" polling technique, sequentially polls each of the feed applications 12–20 to check whether they have any transactions to be processed. If any of the feed applications 12–20 inform the scheduler 28 that they have transactions to be processed, the scheduler 28 retrieves them from the check info database 26, and delivers them to the resource manager 30 for processing.

A priority database 33 and associated dynamic priority changer program 34 are interfaced to the scheduler 28 which allow a system operator to change the priority of a group of transactions (either increase or decrease their priority). In this manner, certain merchants or companies may be given priority over others, depending upon various parameters, such as company ID, date and time range.

Returning now to the details of the calling computer 32, the resource manager 30 is a program which manages the resources for placing telephone calls to the bank information systems. To accomplish this, the resource manager 30 communicates with a state manager 36 and a line manager 38. In response to a verification request received by the resource manager 30 for processing, the state manager 36 creates a state machine 40 for servicing the request. The state machine 40 is a series of programming instructions which are created by the state manager 36 based on information about a particular bank information system's sequence of steps that are required to verify a particular transaction.

A bank database 42 contains all of the messages, sequences and timing information for each bank information system, as well as basic information, such as bank name, identifying number (QCSID), and telephone number for calling the information system. A bank enrollment system 44 is employed which is a data entry application that allows a system operator to input new bank systems into the bank database 42, and change information about existing bank systems already stored in the bank database 42. The operation of the bank enrollment system 44 is discussed in greater detail below in conjunction with FIGS. 3–5. One or more workstations 45 are provided which are interfaced to the system 10, and facilitate data entry through the bank enrollment system 44, dynamic priority changer 34, etc., as well as reception of reports, etc. from the system 10.

Figure 2:
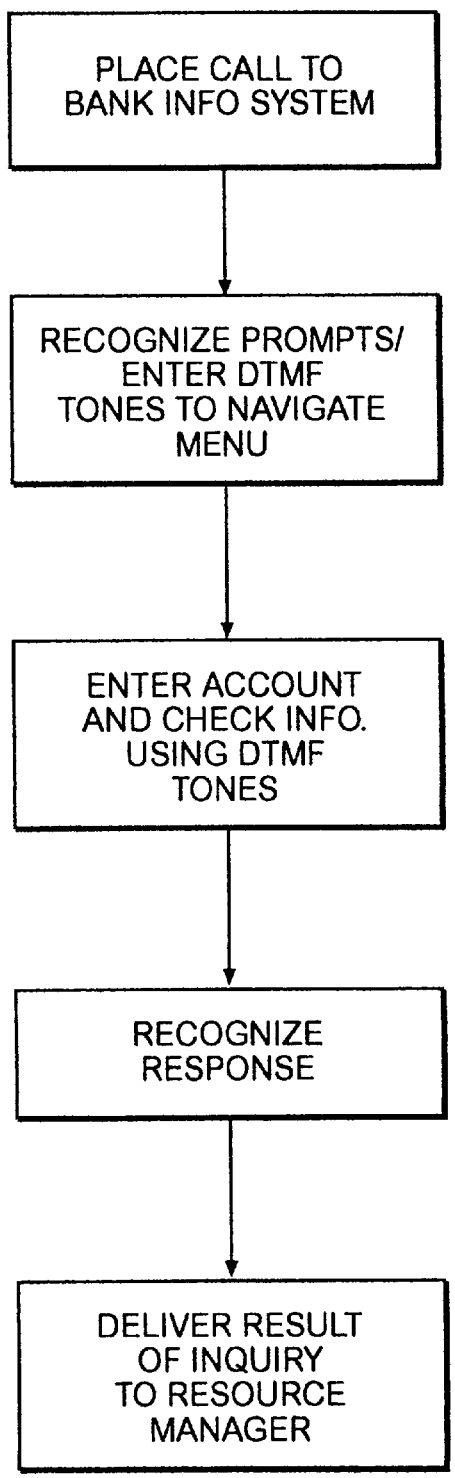
FIG. 2 is a flow chart illustrating a program carried out by a state machine in the system of FIG. 1.

Returning to the state manager 36 and state machine 40, the state manager 36 constructs the state machine 40 by accessing the information stored in the bank database 42 for the particular bank identified in the request or requests to be verified. The resulting state machine 40 carries out the steps illustrated in the flow chart of FIG. 2. In particular, the state machine 40 places a call to the bank information system, enters the DTMF codes necessary to move through the system's menu tree and input the check information for the check to be verified, recognizes the verbal messages generated by the information system, and delivers the result of the inquiry to the resource manager 30.

Returning to FIG. 1, voice recognition software is also provided so that the state machine 40 can recognize the verbal responses generated by each bank information system. In particular, a recognizer program 46 is provided which receives requests from the state machine 40 to perform voice recognition. The recognizer 46 is interfaced to a voice recognition engine 48 which performs the actual recognition. In response to requests received from the state machine 40, the recognizer 46 places requests to the engine 48 to perform the actual speech recognition. Once the recognition has been performed, the engine 48 sends the results back to the state machine 40.

In the preferred embodiments, the voice recognition engine 48 is one provided by Lernout and Hausbie(L&H), although it will be understood that the system 10 could use other voice recognition engines if desired. An advantage of the L&H engine is that it is phonetic in nature, and only requires that the user type in the words that they want the engine 48 to recognize, as opposed to other more laborious methods used by other engines. In this embodiment, the system 10 is designed to listen to 2–10 seconds of each verbal message to be recognized.

A context manager program 50 controls access to a context database 52 containing information used by the engine 48 to perform speech recognition. The context manager 50 receives requests from the bank enrollment system 44 to add or update information in the context database 52, and also receives requests from the recognizer 46 to retrieve context information for specific banks. "Context" is a term used by L&H to describe all of the messages that could be heard at any particular point in a call to a bank's information system. The L&H engine 48 works best when the number of possible messages in a "context" is small (e.g., less than 10 messages). For this reason, in the first preferred embodiment, the messages for each bank information system have each been divided into two different contexts, the first containing all verbal messages generated by the information system before account verification occurs, and a second containing all verbal messages generated by the information system after the account has been verified.

The L&H engine 48 includes a number of parameters that control the way that it goes about recognizing speech. The bank database 42 contains entries for each bank's information system that are used by the recognizer 46 to set these parameters prior to initiating recognition. The methodology employed for setting these parameters is to use the default settings initially for each new bank information system that is entered into the system 10, and if consistent results cannot be obtained from the engine 48, then some of the parameters are adjusted until the engine 48 performs consistently. The specific parameters that are employed in the system 10 include the following.

An accuracy parameter is used to set the number of hypotheses used by the engine's search algorithm. When the bank has messages that the engine 48 can easily distinguish from each other, this parameter is set lower. When the bank has messages that are very similar (e.g., the only difference between sufficient funds message and insufficient funds message is the word "not"), then the parameter is set higher. The trade-off in setting this parameter higher is that the engine 48 will use more CPU power and more memory.

A speech sensitivity parameter is used to adjust the energy threshold in dB (decibel) that a speech signal must exceed in order to be classified as valid speech. For bank information systems which have a higher volume in their recorded message, this parameter is set higher, while for banks which have lower volume in their recorded messages, the parameter is set lower.

A reaction time parameter determines how much trailing silence must be heard before the engine 48 decides that the verbal utterance is complete. This parameter is employed to improve recognition results when it is known that the particular bank information system will have a measurable pause while in the middle of speaking a message (such as banks which insert a date or other variable information in the middle of a response message).

An acceptance parameter specifies the minimum confidence level needed for the engine 48 to accept utterances and return a recognition result. The engine 48 has to deal with considerable uncertainty which is caused by variance in telephone line quality, variances in speech quality produced by bank information systems, and other factors that are not controllable. This parameter is employed to allow for these variances in recognition, and is preferably set between 75 and 95.

A time out parameter is employed which sets the maximum length of the time window in which the engine 48 is active. Bad telephone line quality and other circumstances can cause the engine 48 not to stop at the end of a verbal utterance. In this situation, an "emergency brake" is needed to stop the engine 48 after a reasonable amount of time.

A rejection penalty parameter is provided which controls the rejection of "out of grammar utterances" (voice or noise that does not match any of the messages that are in active "context" for a particular bank information system). Raising this parameter means that "out of grammar utterances" will be more readily accepted by the engine 48, while lowering this parameter makes the engine 48 more likely to reject these "out of grammar utterances" while at the same time possibly rejecting correct utterances.

A garbage penalty parameter is used to control the engine's use of a "garbage" model. A "garbage" model is a specific grammar model that allows the engine 48 to ignore certain parts of an utterance. This is used when a bank inserts variable information in the middle of a message that the system 10 does not want to have an explicit representation for in the context for that bank. By raising this parameter, the engine 48 will not classify any sound as "garbage", while lowering this parameter will make the engine 48 classify many sounds as "garbage".

The L&H engine 48 allows for various methods of passing data, although in the preferred embodiment, the direct passing of WAV buffers method is employed because this allows the results to be reproduced using recorded WAV files. This method is also employed to insure that all audio data received from each bank information system is acted on by the L&H engine 48. In addition, the WAV data is recorded on disk for later analysis of problems in recognition.

Returning now to the line manager 38, this is a program which runs in each of the calling computers 32, and is responsible for performing actions requested by the state machine 40. It uses a software package (in the preferred embodiment of the system 10, a package called VISUAL VOICE provided by ARTISOFT is employed) to control one or more telephone line interface cards 60 (only one illustrated in FIG. 1 for convenience). In a typical implementation, each of the cards 60 may control between 1 and 16 telephone links or lines 62. The line manager 38 is responsible for issuing the necessary commands to all of the cards 60 in each of the calling computers 32. In the preferred embodiments of the system 10, a single one of the interface cards 60 is employed, this being a DIALOGIC four port interface card which allows the line manager 38 to make up to four simultaneous telephone calls to different bank information systems. DIALOGIC telephone interface cards were chosen for the preferred embodiments of the invention for various reasons. First, DIALOGIC has developed software "drivers" for both WINDOWS 95 and WINDOWS NT. The software programs make it possible to easily integrate the DIALOGIC cards with other system software components. DIALOGIC also includes direct software support for WAV files in addition to their own proprietary formats. This direct software support allows easy integration with the L&H engine 48. Finally, L&H has tested their speech recognition engine using DIALOGIC cards, and certifies the operation of their software when DIALOGIC cards are used in a speech recognition project.

Returning now to the bank database 42 and the bank enrollment system 44, the bank database 42 is initially "built" by having operators listen to the voice messages from each bank's information system, and perform the following tasks as they listen to the messages:

1. They transcribe all of the messages. In order to do this, they are provided with several account numbers from each bank, some of which are valid open accounts, some of which are closed accounts, and some of which are accounts that are overdrawn. In this way, the operators are able to transcribe all of the messages that can possibly come from each bank's information system.

2. They record whether a message can be interrupted by sending a DTMF tone to move to the next prompt, and if so, when the tone can be sent.

3. They record how many seconds are necessary to wait before entering requested data, such as bank account number and dollar amount.

4. They record what types of verification characters are used, such as # or *, to indicate that the input is correct or complete.

5. They record the place in the bank information system where the account number is verified, whether this is immediately after the account number is entered, or after the dollar amount has been entered.

6. They record if the bank wants whole dollars or dollars and cents, and if there is a separator (such as # between dollars and cents).

7. They record conditions under which the bank system will transfer calls to a live operator.

8. They record what happens if the bank system has to connect to other "mainframe" systems to access information, and what range of delays can be caused by this connection activity.

9. They record when a bank system will only allow a preset number of accesses to an individual account in a certain period of time (typically a day).

10. They record when a bank will allow multiple requests during a single call, and if there is a limit to the number of multiple requests.

11. For systems that are accessed via a "900" number (pay per call), they record the charge (either per call or per minute), and how many items can be verified for that charge.

Figure 3:
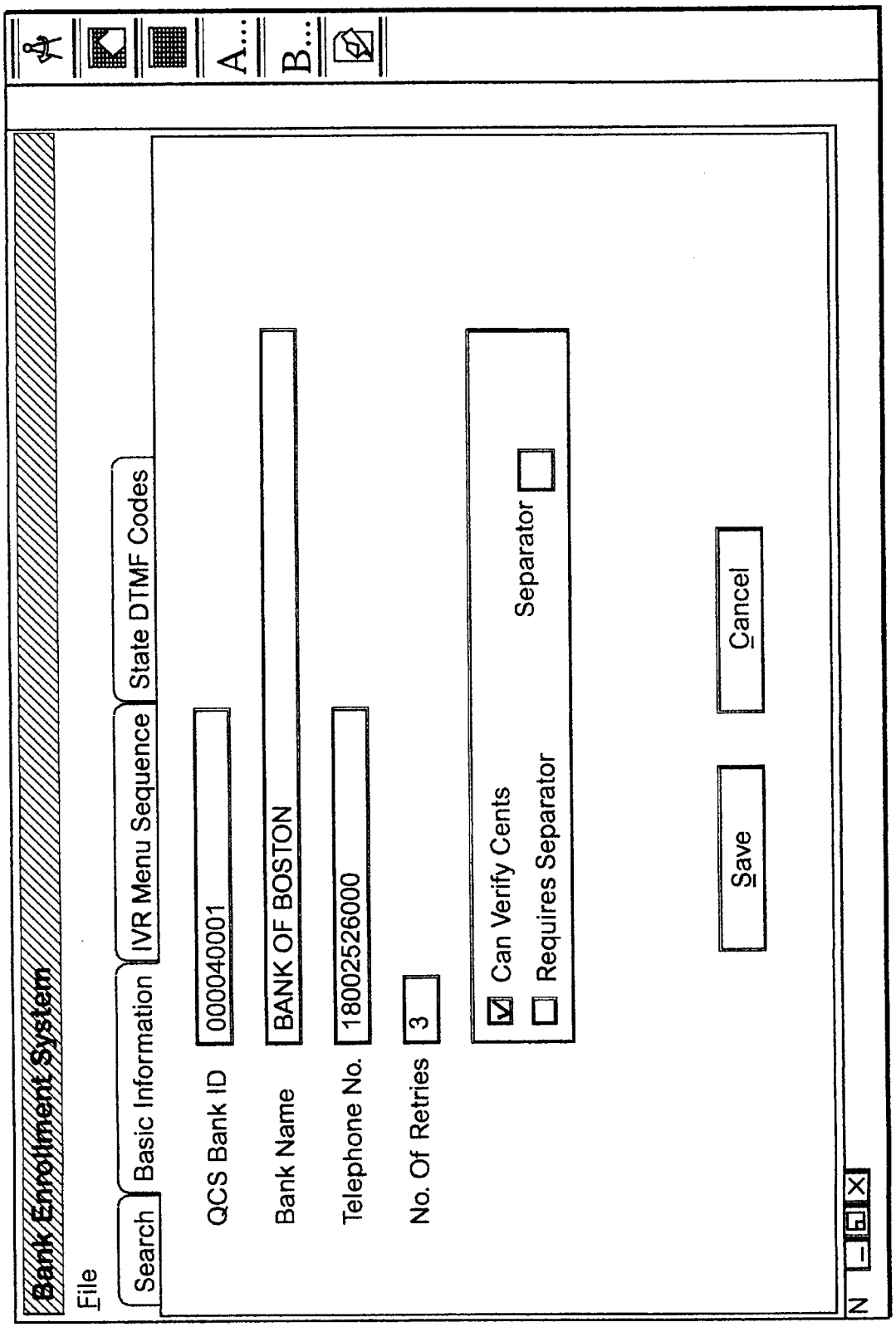
FIG. 3 is an illustration of a computer screen employed in the first preferred embodiment for facilitating entry of bank information system access information.

FIG. 3 is a screen shot of a computer screen employed by the bank enrollment system 44 for entry of basic bank information in the bank database 42. As illustrated, basic information includes the bank identifying number (QCSID), the bank name, the telephone number for the bank information system, how many retries the system will make if the bank information system is busy, and whether the bank requires dollars and cents or just dollars (and if it requires a separator character between dollars and cents).

FIG. 4 is a screen shot of an interactive voice response (IVR) menu sequence screen provided by the bank enrollment system 44 for facilitating entry of all of the actions necessary to "navigate" the bank information system. Each entry on this screen has four elements: Wait, Action, Data and Label. Wait is the number of seconds to wait before performing the action. Note that some actions have a value of zero, which means that the system 10 does not wait between the last action and this action. The reason that this parameter is needed is that many bank information systems are set up so that they only allow the user to begin entering data after they begin "speaking" the message that requests the data. The number of seconds is determined experimentally for each step, and of course may be different for each bank information system.

Action is the action to be taken at each step. Allowable actions are Dial, Verify Account, Verify Funds and Wait. The Dial action is used to either dial the bank information system, or send required digits to the bank information system. The Verify Account action is used when the bank information system validates the checking account number before it verifies funds availability. The Verify Funds action is used at the step when the bank information system verifies funds availability. Wait is used to pause the system for a specified number of seconds. This is used when a bank information system requires the user to wait between transactions (for multiple transactions).

When either Verify Account or Verify Funds is selected, an Enter Verification Information screen is displayed as illustrated in FIG. 5. The operator types in the appropriate fields, the various verbal messages generated by the information system, depending on whether funds are or are not available to pay the check, or the entered account number is invalid.

Data indicates which data is to be sent via DTMF tones to the bank information system when the action is Dial. This can be a numeric digit, a separator (either # or *), the telephone number, the bank routing code, the checking account number, the check number, or the amount of the transaction.

Finally, Label allows the operator to indicate which is the first step to be taken, and which is the step to go to the next transaction (used if the bank allows multiple transactions during a call). The allowable values of this field are Start and Recycle.

In the operation of the system 10, incoming transactions to be verified remain in the check info database 26 until the scheduler 28 receives messages from one or more of the resource managers 30 that resources, i.e., telephone links or lines, are available to perform a bank inquiry. When each resource manager 30 is started, it sends a registration message to the scheduler 28 to inform the scheduler 28 that it is running, and how many interface cards 60 it has available (this information is obtained from the line manager 38). In the preferred embodiment of the system 10, the resource managers 30 send these messages to the scheduler 28 using the MICROSOFT COM/DCOM messaging system. In this way, the scheduler 28 is always aware of exactly how many transaction verifications can be requested simultaneously.

The scheduler 28 continually polls the various feed applications 12–20 in a "round robin" manner to check whether they have any transactions to be verified. The polling is performed based on a combination of type of feed, merchant and bank priority. The scheduler 28 retrieves the bank priority information from the priority database 33. As it polls the feed programs for transactions to be verified, it only requests as many transactions as it knows can be performed simultaneously, based on the information that it constantly is receiving from the resource managers 30. It uses the COM/DCOM messaging system in a synchronous mode to do this polling. That is, it waits for a response from each of the feed applications 12–20, before moving onto the next feed application.

When the scheduler 28 finds one or more transactions to be verified, it sends the transactions one at a time to the resource manager(s) 30 that has/have available resources. It uses the COM/DCOM messaging system in an asynchronous mode to send this information. That is, it does not wait for a response from the resource manager 30 before moving onto its next transaction.

When the resource manager 30 receives a message from the scheduler 28 with one or more transactions to be verified, the resource manager 30 requests that the state manager 36 construct the appropriate state machine 40 for the particular bank's information system. Once the state machine 40 is created, the resource manager 30 sends it the check information and the telephone line information, and the state machine 40 begins the steps necessary to perform the transaction verification.

The state machine 40 starts by retrieving the context information for the particular bank from the context database 52, and sends this information to the recognition engine 48. Next, using the line manager 38, it dials the bank information system and sends the necessary DTMF tones to activate the bank information system's menu, and enter the bank account number and dollar amount to be verified. At the appropriate place in this sequence, the state machine 40 transfers the digitized voice message(s) spoken by the bank information system to the recognizer 46, and waits for the recognizer 46 to match the voice against the messages in the selected context.

When the recognizer 46 has matched the voice against a message, it returns the ID number of the message to the state machine 40. From the ID number, the state machine 40 determines which of the messages stored in the context database 52 has been identified by the recognizer 46 as being the message spoken by the bank information system. From this message, the state machine 40 determines whether the entered transaction has been verified, denied or otherwise not processed by the bank information system. This information is then passed through the resource manager 30 and the scheduler 28 to the check info database 26. The one of the feed applications 12–20 that sent the request periodically queries the check entry info database 26, and retrieves the result of the verification request once it has been delivered by the scheduler 28.

In the event that the recognizer 46 is unable to match the voice against any of the messages in the context, it informs the state machine 40, which sends this information back to the scheduler 28 that it was unable to provide any information about this transaction, and the scheduler 28 stores this information in the check info database 26 for access by the feed application that sent the request. The system 10 then retries a specified number of times (the number of times is operator controlled) before it marks the particular bank system as being temporarily unavailable. The system 10 reports this "out of service" condition to a human operator via a printed report, and/or, by beeping an operator and/or delivering a recorded voice message. If the recognizer 46 repeatedly fails to recognize verbal messages generated by a particular bank's information system, this is usually an indication that the bank has changed its menu and/or messages. The "out of service" reports or messages are thus useful in indicating to an operator that a particular bank's information system should be manually called to determine whether the information stored in the bank database 42 for that bank needs to be changed.

The system 10 includes a number of additional operating functions to increase its capabilities and convenience of use. For example, the system 10 can organize its calls so that if it has multiple calls for the same bank waiting, it can continue requesting information from that bank's system without re-dialing. This function works in two manners. For a first list of banks, a line is kept open as much as possible during certain hours of the day ("high priority time window"). The system operator has a maintenance function to maintain these lists. These include very high volume banks (e.g., Bank of America, Chase Manhattan, etc.). For these banks, this system first checks to see if there are any other requests for this bank with priority greater than X, a value which can be changed by the operator.

To do this, the system 10 scans the pending transactions in descending priority order and in a first in, first out manner. If there are any requests with priority greater than X, the system 10 will process the requests immediately. If there are no requests with priority greater than X, the system 10 keeps the port open until either the bank information system disconnects, or until a certain time limit is exceeded. The system 10 will reconnect to this bank information system after a delay of a preselected number of seconds, even if there is no pending transaction.

During times outside of the high priority time window, and for all other banks, the system 10 operates in the following manner. When a request is completed, and if the particular bank allows multiple requests in one call, the system 10 first checks to see if there are any other requests for this bank with priority greater than Y, a value which can be changed by the system operator. Again, the system 10 will scan the queues in descending priority order and in a first in/first out manner. If there are requests with priority greater than Y, the system 10 checks to see if the particular IVR port is needed for any calls with priority higher than Z, another value that can be changed by the operator. If the IVR port is not needed for other requests with priority greater than Z, then the system 10 will process this request.

The system 10 automatically re-queues calls when a busy signal is detected, keeps statistics on all calls made, and provides a function for purging this log based on dates and/or particular banks. This current function allows for selective exclusion (by a list of banks) during date purge. The information recorded is different for individual calls versus multiple requests, and is as follows:

| Individual | Multiple |
| --- | --- |
| Time Request Received | Time Request Received |
| Time dial tone acquired | Time data entry (account number started) |
| Time bank answered | Time data entry completed |
| Time data entry (account number started) | Time message recorded |
| Time data entry completed | Time message analysis completed |
| Time message recorded | |
| Time message analysis completed | |

There is an analysis function that allows generation of a report on this log. The reports produced include the following, although it will be understood that other reports may also be generated:

1. Number of calls (in time frame), sorted by number of calls to each bank, and descending order.

2. Number of calls (in time frame) that had to wait to start processing, sorted by number of calls to each bank, in descending order. This will include the average wait time.

3. Number of calls that took longer than X seconds (this time to start once the call is initiated), sorted by number of calls to each bank, in descending order.

4. Port utilization (by date/time range). This is used in conjunction with report (2) to plan hardware expansion needs. This report will report total time off hook per port both in minutes and as a percentage of total minutes in the selected range.

Preferably, the system 10 is scalable to allow for large calling volumes (projected 50,000–100,000 calls per week). To achieve this scalability, the system 10 preferably employs a high performance database engine, MICROSOFT SQL SERVER, to implement the check info priority and bank databases 26, 33 and 42, respectively, and the system design allows for simple upgrade to even more powerful engines, such as Oracle. In addition, a high performance language, MICROSOFT C++, which can run on PC's, as well as on super-micros and mainframe computers, was employed to write the programs for the scheduler 28, resource manager 30, priority changer 34, state manager 36, line manager 38, state machine 40, bank enrollment system 44, recognizer 46 and context manager 50. In the preferred embodiment, the system 10 runs on a PC type platform using a combination of WINDOWS 95 and WINDOWS NT operating systems, and is capable of accessing data using SYBASE, ORACLE, SQLSERVER, BTRIEVE, DBASE and FOXPRO. Finally, the separation of software components and a client-server model allows greater flexibility in managing large numbers of telephone interface cards.

The microfiche software Appendix contains the computer listing for an initial prototype application for implementing the first preferred embodiment of the present invention. In this application, the scheduler 28 and priority changer 34 have been incorporated in the resource manager 30. However, it should be understood that the embodiment illustrated in FIG. 1, wherein these three elements have been separated with the scheduler 28 and priority changer 34 in the main computer 11, and a separate resource manager 30 in each calling computer 32, is preferred to accommodate high volumes of transactions to be processed. The following index indicates at which frames in the microfiche Appendix the program listing for each of the various elements of the system 10 is located:

| Element Name | Frames in Appendix | Description |
|---|---|---|
| Stdafx | 1 | General system code |
| AVS Tracer | 2–14 | Software to debug operation of program |
| Line Manager 38 | 15–22 | |
| Context Manager 50 | 23–54 | |
| QCS Objects | 55–67 | General system code |
| Recognizer 46 | 68–111 | |
| Resource Manager 30 | 112–131 | |
| State Manager 36 | 132–208 | Includes code for constructing state machine 40 |
| Bank enrollment system 44 | 209–272 | |
| FOXPRO Feed application 12 | 273–292 | |

Figure 6:
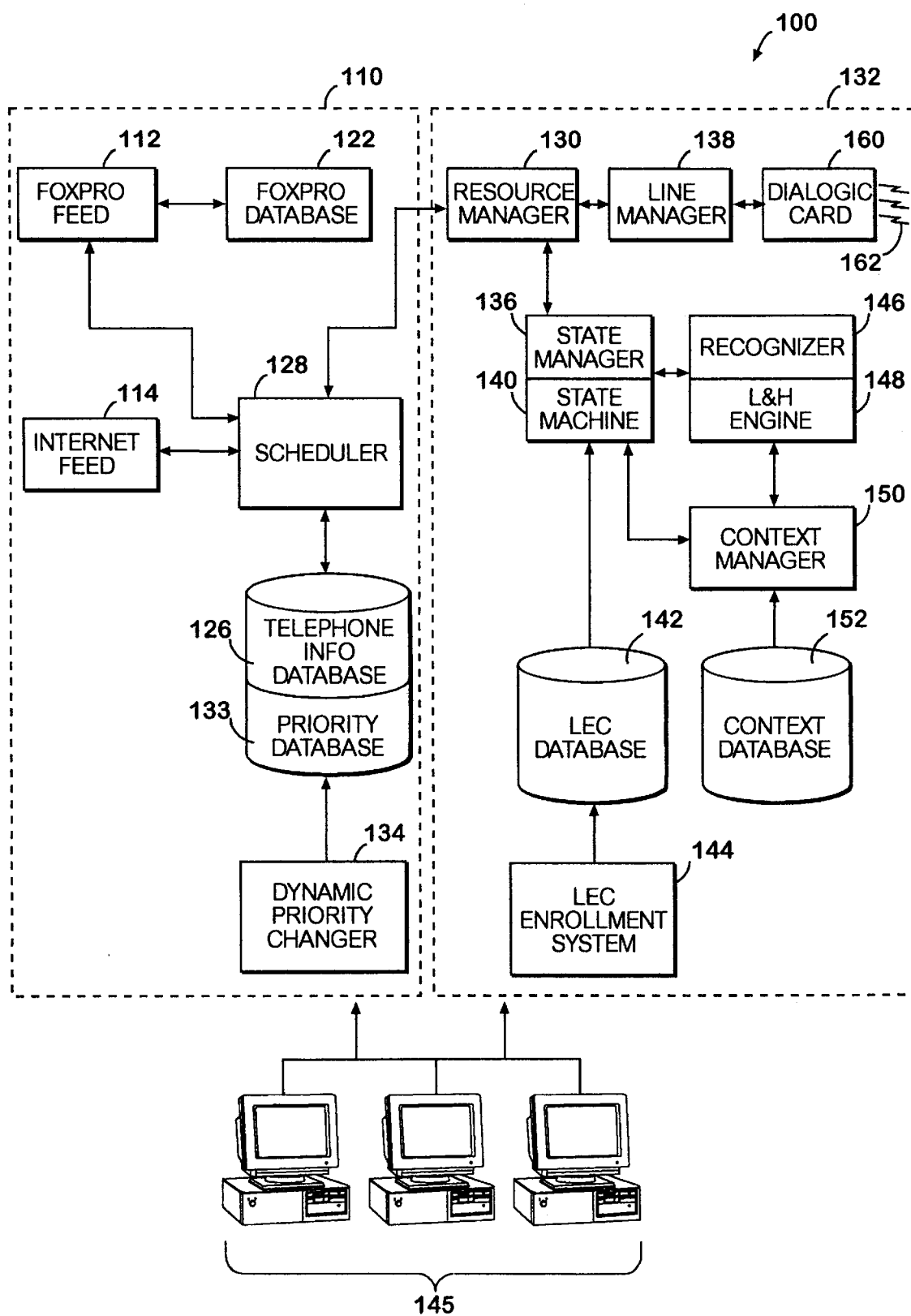
FIG. 6 is a schematic block diagram of a system constructed in accordance with a second preferred embodiment of the present invention for automatically verifying the operational status of telephone numbers.

Turning now to FIG. 6, the block diagram for a second preferred embodiment of the present invention is illustrated. This embodiment comprises a system 100 which is employed for automatically verifying the status of telephone numbers by dialing the numbers, making a record of any verbal message which is received in response and employing voice recognition to decide what was said. As illustrated, the system 100 includes many of the same elements as the system 10 illustrated in FIG. 1, although the functions of a number of these elements have been changed to accommodate the different use of the system 100. These elements include the following: A main computer 110 is provided for receiving and scheduling lists of telephone numbers whose status is to be checked or verified. The main computer 110 includes a pair of feed applications 112 and 114 which facilitate entry of telephone numbers to be verified from a pair of sources, including a FOXPRO feed 112 and an Internet feed 114. A FOXPRO database 122 is interfaced to the FOXPRO application 112 for entering FOXPRO formatted data therein. The feed applications 112 and 114 operate in the same manner as discussed previously in conjunction with the system 10 of FIG. 1.

The telephone number status requests received by the feed applications 112 and 114 each contain the identification of the requester (company ID), the telephone numbers to be verified, and the priority of the request. All of this information is temporarily stored in a telephone information database 126 until the requests are ready to be processed by the system 100 as described in further detail below.

The remaining elements of the main computer 110 include a scheduler 128 which receives instructions from a resource manager 130 in one or more calling computers 132 (only one illustrated in FIG. 6). A dynamic priority changer program 134 is also provided for updating priority information contained in a priority database 135.

The calling computer 132 also employs the same elements employed in the calling computer 32 of the system 10, including a state manager 136, line manager 138 and state machine 140. A LEC (local exchange carrier) database 142 is interfaced to the state machine 140 which contains all of the messages which may be generated by each local telephone company's information system in response to dialing of a number which has either been changed, or is out of order. A LEC enrollment system 144 is employed which is a data entry application that allows a system operator to input new LEC information into the LEC database 142, and change information about existing LECs already stored in the LEC database 142. One or more workstations 145 are provided which are interfaced to the system 100, and facilitate data entry through the LEC enrollment system 144, dynamic priority changer 134, etc., as well as reception of system reports, etc.

The state manager 136 constructs the state machine 140 by accessing the information stored in the LEC database 142 for the particular telephone company in the area covered by the telephone number to be verified. The resulting state machine thus dials the telephone number, recognizes any verbal messages generated in response, and passes this information to a speech recognizer program 146. In this embodiment, the system 100 is designed to listen to between 5 and 20 seconds of each message. As in the system 10 of FIG. 1, the speech recognizer 146 is interfaced to a speech recognition engine 148 which performs the actual recognition, and is preferably an L&H engine. A context manager program 150 controls access to a context database 152 which contains information used by the engine 148 to perform speech recognition. The context manager 150 receives requests from the LEC enrollment system 144 to add and update information in the context database 152, and also receives requests from the recognizer 146 to retrieve context information for specific LECs. As in the system 10 of FIG. 1, the line manager 138 is responsible for performing actions requested by the state machine 140 for control of one or more telephone line interface cards 160 which connect the calling computer 132 to one or more ISDN lines 162.

Stored in the LEC database 142 are all possible verbal messages which are generated by any LEC in response to the dialing of a changed or disconnected telephone number. Following are examples of these messages:

CHANGED NUMBERS ("C" MESSAGES)

1. The number you are calling (7D) has been changed. The new number is (7D or lOD). Please make a note of it.

2. The number you have reached (7D) has been changed. The new number is (7D or lOD). Please make a note of it.

3. The number you have dialed (7D) has been changed. The new number is (7D or 10. Please note, the new number is (7D or 10D).

4. The number you have reached, area code (10D) has been disconnected. Calls are being taken by area code (10D). Please make a note of it.

5. The number you have reached, area code (10D) has been changed. The new number is area code (10D). Please make a note of it.

6. We are sorry (7D) has been changed. The new number is (7D or 10D). Repeating, the new number is (7D or 10D).

7. The number you are calling, area code (10D) has been changed. The new number is area code (10D). Please make a note of it.

DISCONNECTED NUMBERS ("D" MESSAGES)

1. We are sorry, the number that you dialed is disconnected.

2. We are sorry, the number (7D) you dialed has been disconnected. No further information is available.

UNLISTED NUMBERS ("U" MESSAGES)

1. The number you are dialing (7D) has been changed to an unlisted number. No further information is available.

In the operation of the system 100, ISDN (Integrated Services Digital Network) lines are employed to place telephone calls. The reason for using ISDN lines rather than other telephone lines, such as analog or T1, is that ISDN provides digital messages from the LEC at the called party location which identify status information about the calls. This information is provided on the "D" channel which is used for ISDN signalling. The information provided by the LEC typically includes the following:

A—Called number is being rung.

B—Called number is not allocated.

C—Called number is busy.

D—Called number has been changed.

E—Called number is out of order.

F—Call has been rejected by the LEC.

The system 100, in response to receiving any of the signals A–F above, takes the following corresponding actions, respectively:

A—Terminate the call and mark the number as active.

B—Terminate the call and mark the number as not allocated.

C—Terminate the call and mark the record for recall later in the calling sequence.

D—Record the voice message which is played by the LEC giving the changed number.

E—Terminate the call and mark the number as out-of-order.

F—Terminate the call and mark the record for recall later in the calling sequence.

The operation of the system 100 is also generally similar to that of the system 10 in FIG. 1. The groups of telephone numbers to be verified remain in the telephone information database 126 until the scheduler 128 receives the messages from one or more of the resource managers 130 that ISDN lines are available to call the telephone numbers and check their status. The scheduler 128 polls the feed applications 112 and 114 in a "round robin" manner as discussed previously. When the resource manager 130 receives a message from the scheduler 128 with one or more telephone numbers or groups of telephone numbers to be verified, the resource manager requests that the state manager 136 construct an appropriate state machine 140 for the particular LEC administering the area code or codes in which the numbers to be verified are located.

Once the state machine 140 is created, it begins the steps necessary to perform the telephone number status verification. The state machine 140 starts by retrieving the context information for the particular LEC from the context database 152, and sends this information to the recognition engine 148. Next, it dials the first telephone number using the line manager 138. The "D" channel is then monitored to determine which control signals are sent in response to the dialing of the number. If the control signal indicates that the number has been changed or disconnected, the line manager 138 remains connected to the number so that any recorded message may be received over the voice channel, and delivered to the recognizer 146 which attempts to match the voice message against the messages in the selected context. When the recognizer 146 has matched the voice against the message, it returns the ID number of the message to the state machine 140, which determines from the message whether the number has been changed or disconnected. In addition, if the number has been changed and the message indicates the new number, the state machine 140 determines the identity of the new number.

Once the system 100 has completed status checking each number on a list of telephone numbers, it compiles the retrieved information and makes it available to the one of the feed applications 112–114 which made the request by storing it in the telephone information database 126. In particular, for each telephone number on the list, the system 100 indicates both the status of the telephone number, and if it has been changed, the new telephone number. In this manner, the entered list of telephone numbers is updated so that a telemarketer using the list will not place calls to changed or disconnected numbers.

Although the present invention has been described in terms of a number of preferred embodiments, it will be understood that numerous modifications and variations could be made thereto without departing from the scope of the invention as set forth in the following claims.

What is claimed is:

1. A system for accessing and retrieving speech-based information comprising:

a) at least a first feed application for entering a request for information from a speech-based information system which is accessible at a selected predetermined telephone number;

b) a scheduler interfaced to said first feed application for coordinating the acceptance and delivery of said request from said first feed application, based upon a number of lines that are available for calling a plurality of predetermined telephone numbers, and a number of requests that are ready for processing; and c) a calling computer interfaced to said scheduler for receiving and processing said number of requests said calling computer including:

1) a line manager for placing a telephone call to said speech-based information system at said selected predetermined telephone number;

2) a resource manager for notifying said scheduler of said number of lines that are available for said line manager to call said plurality of predetermined telephone numbers;

3) a speech recognizer for recognizing one or more verbal messages generated by said speech-based information system in response to a call placed by said line manager to said selected predetermined telephone number; and 4) a program employing said line manager and said speech recognizer in response to said request for information for placing a call to said speech-based information system, recognizing one or more verbal messages generated by said speech-based information system, and delivering a response to said request in accordance with said one or more verbal messages.

2. The system of claim 1, further comprising:

d) a priority database interfaced to said scheduler for storing priority information for each request received from said first feed application; and e) a priority changer interfaced to said priority database for selecting said priority information, said priority information being employed by said scheduler to control the order in which requests received from said first feed application are delivered to said calling computer for processing.

3. The system of claim 1, wherein said first feed application is one of a plurality of feed applications, and said scheduler further includes means for:

1) polling each of said plurality of feed applications in response to a command from said calling computer to determine whether any of said plurality of feed applications has requests to be processed; and 2) delivering said requests to said calling computer for processing.

4. The system of claim 1, further including:

d) a context database interfaced to said recognizer, said context database storing voice messages to be recognized by said recognizer; and e) means for editing or entering voice messages in said context database.

5. The system of claim 4, further comprising:

f) a check info database for receiving from said first feed application, information pertaining to a checking account transaction to be verified by said calling computer, and storing a result of a transaction verification;

g) a bank database interfaced to said calling computer, said bank database containing for each of a plurality of banks, the telephone number of said bank's automated account information system, DTMF tone information for navigating a menu for said information system, and expected voice messages to be generated by said information system in response to menu selections and entered account information; and h) a bank enrollment system for entering and editing information contained in said bank database.

6. The system of claim 5, wherein said check info database contains, for each transaction to be verified, bank identification information, checking account identification information, and check transaction information, and said program includes steps for:

1) calling an automated account information system for a bank identified in a transaction;

2) recognizing verbal messages generated by said information system;

3) entering the DTMF tones which are necessary to navigate the information system's menu and enter transaction information for a transaction to be verified;

4) recognizing a verbal message generated by said information system in response to a transaction verification request; and, 5) determining the status of said transaction from said message.

7. The system of claim 6, wherein said program further includes steps for:

6) recalling said automated account information system if said program is unable to recognize a verbal message generated by said information system in response to a transaction verification request; and 7) generating an indication that said automated account information system is out of service if said program is unable to recognize a verbal message generated by said information system after a predetermined number of attempts.

8. The system of claim 4, further comprising:

f) a telephone number database for receiving telephone numbers from said first feed application whose status is to be verified by said calling computer, and storing a result of a status verification;

g) a telephone company database interfaced to said calling computer, said telephone company database containing, for each of a plurality of telephone companies, expected voice messages to be generated by an automated information system in response to dialing of inoperable telephone numbers; and h) a telephone company enrollment system for entering and editing information contained in said telephone company database.

9. The system of claim 8, wherein said program further includes steps for:

1) dialing a telephone number in said telephone number database;

2) recognizing any verbal messages generated in response to said dialing; and, 3) determining the status of said telephone number from said message.

10. The system of claim 9, wherein said line manager interfaces said calling computer to at least one ISDN telephone link including a voice B channel and a signaling D channel, and said program further includes means for monitoring said D channel after dialing a telephone number to be verified, and determining the status of said telephone number from signals on said D channel.

11. The system of claim 9, wherein said program further includes means for recognizing a verbal message indicating that a dialed telephone number has been changed to a new specified number, and delivering the identity of said new number to said feed application.

12. The system of claim 1, wherein said line manager further includes means for:

1) controlling a plurality of lines, and providing a signal indicative of a quantity of said request that said calling computer can process; and 2) directing said scheduler to deliver said quantity of said request to said calling computer for processing.

13. A method for accessing and retrieving speech-based information comprising the steps of:

a) providing at least a first feed application for entering a request for information from a speech-based information system which is accessible at a selected predetermined telephone number;

b) providing a scheduler interfaced to said first feed application for coordinating the acceptance and delivery of said request from said first feed application, based upon a number of lines that are available for calling a plurality of predetermined telephone numbers, and a number of requests that are ready for processing;

c) interfacing a calling computer to said scheduler for receiving and processing said number of requests, said computer including:

1) a line manager for placing a telephone call to said speech-based information system at said selected predetermined telephone number;

2) a resource manager for notifying said scheduler of said number of lines that are available for said line manager to call said plurality of predetermined telephone numbers;

3) a speech recognizer for recognizing one or more verbal messages generated by said speech-based information system in response to a call placed by said line manager to said selected predetermined telephone number; and 4) a program employing said line manager and said speech recognizer in response to said request for information for placing a call to said speech-based information system, recognizing one or more verbal messages generated by said speech-based information system, and delivering a response to said request to said first feed application in accordance with said one or more verbal messages;

d) entering into said first feed application a request for information from said speech-based information system;

e) delivering said request to said calling computer for processing;

f) connecting said calling computer to said speech-based information system by dialing said selected predetermined telephone number with said line manager;

g) employing said speech recognizer to recognize one or more verbal messages generated by said information system; and h) generating a response to said request in accordance with said one or more verbal messages.

14. The method of claim 13, wherein said first feed application enters a plurality of requests to be processed, and enters priority information for each request, and said scheduler employs said priority information to control the order in which said requests are delivered to said calling computer for processing.

15. The method of claim 13, wherein said first feed application is one of a plurality of feed applications, and said scheduler further carries out the steps of:

1) polling each of said plurality of feed applications in response to a command from said calling computer to determine whether any of said plurality of feed applications has requests to be processed; and 2) delivering said requests to said calling computer for processing.

16. The method of claim 13, further comprising the steps of:

i) reconnecting said calling computer to said speech-based information system if said speech recognizer fails to recognize one or more verbal messages generated by said information system;

j) generating an indication that said information system is out of service if said speech recognizer fails to recognize one or more verbal messages generated by said information system after a predetermined number of attempts to do so have been made.

17. The method of claim 13, wherein said step of said recognizer recognizing one or more verbal messages further comprises the steps of:

1) storing in a context database interfaced to said recognizer, voice messages to be recognized by said recognizer;

2) comparing verbal messages generated by said speech-based information system to said stored messages; and 3) determining the identity of said generated verbal messages from the results of said comparing step.

18. The method of claim 17, wherein said steps of entering and delivering a request, connecting said calling computer, and employing said speech recognizer further comprise:

1) entering into said first feed application, information pertaining to a checking account transaction to be verified by said calling computer, said information including bank identification information, checking account identification information, and check transaction information;

2) delivering said information to said calling computer;

3) accessing a bank database interfaced to said calling computer, said bank database containing for each of a plurality of banks, a telephone number of said bank's automated account information system, DTMF tone information for navigating a menu for said information system, and expected voice messages to be generated by said information system in response to menu selections and entered account information;

4) retrieving voice message information from said bank database pertaining to the bank information system for the bank identified by said bank identification information;

5) connecting said calling computer to said automated account information system for said bank identified in said request by dialing the telephone number stored in said bank database for said bank;

6) recognizing verbal messages generated by said bank information system by comparing said messages to messages stored in said bank database for said bank;

7) entering DTMF tones which are necessary to navigate the bank information system's menu and enter said information for said transaction to be verified;

8) recognizing a verbal message generated by said information system in response to a transaction verification request; and 9) determining the status of said transaction from said message.

19. The method of claim 17, wherein said steps of entering and delivering a request, connecting said calling computer, and employing said speech recognizer further comprise:

1) entering into said first feed application, a telephone number whose status is to be verified by said calling computer;

2) delivering said telephone number to said calling computer;

3) accessing a telephone company database interfaced to said calling computer, said telephone company database containing, for each of a plurality of telephone companies, expected voice messages to be generated by said automated information system in response to dialing of inoperable telephone numbers;

4) retrieving from said telephone company database, expected voice messages for a telephone company administering said telephone number to be verified;

5) connecting said calling computer to a speech-based information system by dialing the entered telephone number;

6) recognizing a verbal message generated by said information system by comparing said message to messages stored in said telephone company database for said telephone company; and 7) determining the status of said telephone number from said message.

20. The method of claim 19, wherein said line manager interfaces said calling computer to at least one ISDN telephone link including a voice B channel and a signaling D channel, and said step of determining the status of said telephone number further comprises detecting signals generated on said D channel in response to dialing of said telephone number to be verified, and determining the status of said telephone number from said detected signals on said D channel and any verbal message generated by said information system.

21. The method of claim 20, wherein if said verbal message indicates that a dialed telephone number has been changed to a new specified number, said step of determining the status of said telephone number further comprising determining the identity of said new number.

22. The method of claim 13, wherein said line manager carries out the further steps of:

1) controlling a plurality of lines, and providing a signal indicative of a quantity of said request that said calling computer can process; and 2) directing said scheduler to deliver said quantity of said request to said calling computer for processing.

23. A system for accessing and retrieving speech-based information comprising:
   a) a plurality of feed applications for entering at least a first request for information from a plurality of speech-based information systems which are accessible at selected predetermined telephone numbers;
   b) a scheduler interfaced to said plurality of feed applications for coordinating the acceptance and delivery of said first request from said plurality of feed applications based upon a number of lines that are available for calling a plurality of predetermined telephone numbers; and
   c) a calling computer interfaced to said scheduler for receiving and processing said first request, said calling computer including:
      1) a resource manager for notifying said scheduler of said number of lines that are available for calling said plurality of predetermined telephone numbers;
      2) a line manager for controlling a plurality of lines, and placing a telephone call to one of said speech-based information systems at one of said predetermined telephone numbers ,in response to said scheduler delivering said first request to said line manager based upon the notification from said resource manager of said number of lines that are available;
      3) a speech recognizer for recognizing one or more verbal messages generated by one of said speech-based information systems in response to a call placed by said line manager to one of said selected predetermined telephone numbers; and
      4) a program employing said line manager and said speech recognizer, in response to said first request for information, for placing a call to said speech-based information system, recognizing one or more verbal messages generated by said speech-based information system, and delivering a response to said first request in accordance with said one or more verbal messages.

24. A method for accessing and retrieving speech-based information comprising the steps of:
   a) providing a plurality of feed applications for entering at least a first request for information from a plurality of speech-based information systems which are accessible at selected predetermined telephone numbers;
   b) providing a scheduler interfaced to said plurality of feed applications for coordinating the acceptance and delivery of said first request, based upon a number of lines that are available for calling a plurality of predetermined telephone numbers;
   c) providing a calling computer interfaced to said scheduler for receiving and processing said first request, said calling computer including:
      1) a resource manager for notifying said scheduler of said number of lines that are available for calling said plurality of predetermined telephone numbers;
      2) a line manager for controlling a plurality of lines, and placing a telephone call to one of said speech-based information systems at one of said predetermined telephone numbers ,in response to said scheduler delivering said first request to said line manager based upon the notification from said resource manager of said number of lines that are available;
      3) a speech recognizer for recognizing one or more verbal messages generated by one of said speech-based information systems in response to a call placed by said line manager to one of said selected predetermined telephone numbers; and
      4) a program employing said line manager and said speech recognizer, in response to said first request for information, for placing a call to said speech-based information system, recognizing one or more verbal messages generated by said speech-based information system, and delivering a response to said first request to said feed application in accordance with said one or more verbal messages;
   d) entering into said feed application a first request for information from said speech-based information system;
   d) delivering said first request to said calling computer for processing;
   e) connecting said calling computer to said speech-based information system by dialing said telephone number with said line manager;
   f) employing said speech recognizer to recognize one or more verbal messages generated by said information system; and
   g) generating a response to said first request in accordance with said one or more verbal messages.

* * * * *